United States Patent [19]
Ito

[11] Patent Number: 5,833,345
[45] Date of Patent: Nov. 10, 1998

[54] AUTOMOBILE HEADLAMP

[75] Inventor: Takaya Ito, Shizuoka, Japan

[73] Assignee: Koito Manufacturing Co., Ltd., Tokyo, Japan

[21] Appl. No.: 582,399

[22] Filed: Jan. 3, 1996

[30] Foreign Application Priority Data

Jan. 26, 1995 [JP] Japan ................................. 7-028884

[51] Int. Cl.⁶ .................................................. B60Q 1/06
[52] U.S. Cl. .............................. 362/66; 362/80; 362/250; 362/287
[58] Field of Search ............................. 364/80, 232, 233, 364/250, 269, 282, 283, 287, 427, 429, 61, 66

[56] References Cited

U.S. PATENT DOCUMENTS

| 4,916,589 | 4/1990 | Nakamura et al. | 362/250 |
| 4,935,855 | 6/1990 | Narita | 362/287 |
| 5,390,087 | 2/1995 | Daumuller et al. | 362/61 |

FOREIGN PATENT DOCUMENTS

| 601016 | 2/1926 | France | 362/287 |
| 683865 | 6/1930 | France | 362/287 |
| 2727190 | 5/1996 | France . | |
| 5-23302 | 3/1993 | Japan . | |
| 5-83903 | 11/1993 | Japan . | |

*Primary Examiner*—Stephen F. Husar
*Attorney, Agent, or Firm*—Morgan, Lewis & Bockius LLP

[57] ABSTRACT

An automobile headlamp comprising a headlamp bulb, a position lamp bulb, a lamp body, and a reflector supported on the lamp body so as to be tiltable. The reflector has an inserting hole and the headlamp bulb is mounted on the reflector. The position lamp bulb is tiltable together with the reflector and is inserted through the inserting hole so as to be positioned inside the reflector.

20 Claims, 7 Drawing Sheets

AUTOMOBILE HEADLAMP

BACKGROUND OF THE INVENTION

1. Field of the Invention

This invention relates to an automobile headlamp.

2. Discussion of the Related Art

An automobile headlamp having a headlamp bulb and a position lamp bulb has been disclosed by Japanese Utility Patent Application (OPI) Nos. 83903/1993 and 23302/1993 (the term "OPI" as used herein means an "unexamined publication application").

The conventional automobile headlamp is designed as shown in FIG. 11. That is, a reflector b is supported by lamp body a in such a manner that it is tiltable, and a headlamp bulb c is mounted on the reflector b. The reflector b has an insertion hole d. A position lamp bulb e is mounted on the lamp body a in such a manner that its light emitting portion f is inserted into the insertion hole d, thus appearing inside the reflector b.

In the automobile headlamp shown in FIG. 11, the reflector b is tiltable, while the position lamp bulb e is mounted on the lamp body a which is a stationary member. Hence, in order to prevent the position lamp bulb e from colliding with the reflector b no matter where the reflector is positioned in its range of tilting angles, the insertion hole d must be made relatively large. However, the large insertion hole d appears noticeable through the front lens, thus spoiling the external appearance of the headlamp.

In addition, to increase the diameter of the insertion hole is to decrease the effective reflecting area of the reflector b as much. This is another problem.

SUMMARY OF THE INVENTION

Accordingly, the present invention is directed to an automobile headlamp that substantially obviates one or more of the problems due to limitations and disadvantages of the related art.

An object of the invention is to provide an automobile headlamp having a headlamp bulb and a position lamp bulb, which is improved in external appearance by reducing the size a bulb inserting hole for positioning the position lamp bulb inside the reflector to the extent that it is just large enough for insertion of the position lamp bulb.

The above-described problems have been solved by the provision of an automobile headlamp having a headlamp bulb and a position lamp bulb, in which, according to the invention, a reflector on which the headlamp bulb is mounted is supported on a lamp body in such a manner that the reflector is tiltable, and has an inserting hole, and the position lamp bulb is provided tiltable together with the reflector, and is inserted through the inserting hole into the reflector, thus being positioned inside the reflector.

That is, with the automobile headlamp of the invention, the position lamp bulb is tilted together with the reflector lamp. Hence, the bulb inserting hole into which the position lamp bulb is inserted may be reduced in diameter to the extent that it is just large enough for insertion of the position lamp bulb. Accordingly, the resultant bulb inserting hole is not noticeable even when viewed through the front lens. This feature improves the external appearance of the headlamp. In addition, the reduction in diameter of the bulb inserting hole contributes to the increase in effective reflection surface of the reflector.

Such an automobile headlamp is designed as follows. A front of a lamp body is covered with a lens. A holder is supported in the lamp body in such a manner that it is tiltable. A high-beam reflector is supported on the holder. A headlamp bulb is mounted on the reflector. A light emitting section of a position lamp bulb mounted on the holder is inserted into a bulb inserting hole formed in the reflector, thus being positioned inside the reflector.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention provides an automobile headlamp comprising a headlamp bulb, a position lamp bulb, a lamp body, and a reflector supported on the lamp body so as to be tiltable, the reflector having an inserting hole, wherein the headlamp bulb is mounted on the reflector, and wherein the position lamp bulb is tiltable together with the reflector and is inserted through the inserting hole so as to be positioned inside the reflector.

To further achieve these and other advantages and in accordance with the purpose of the present invention, as embodied and broadly described, the present invention also provides an automobile headlamp comprising a lamp body, a reflector supported on the lamp body so as to be tiltable, the reflector having an inserting hole, and a mounting hole, wherein the mounting hole is tiltable with the reflector such that, when a position lamp bulb is received by the mounting hole, the position lamp bulb extends through the inserting hole and is tiltable with the reflector.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Figure 1:
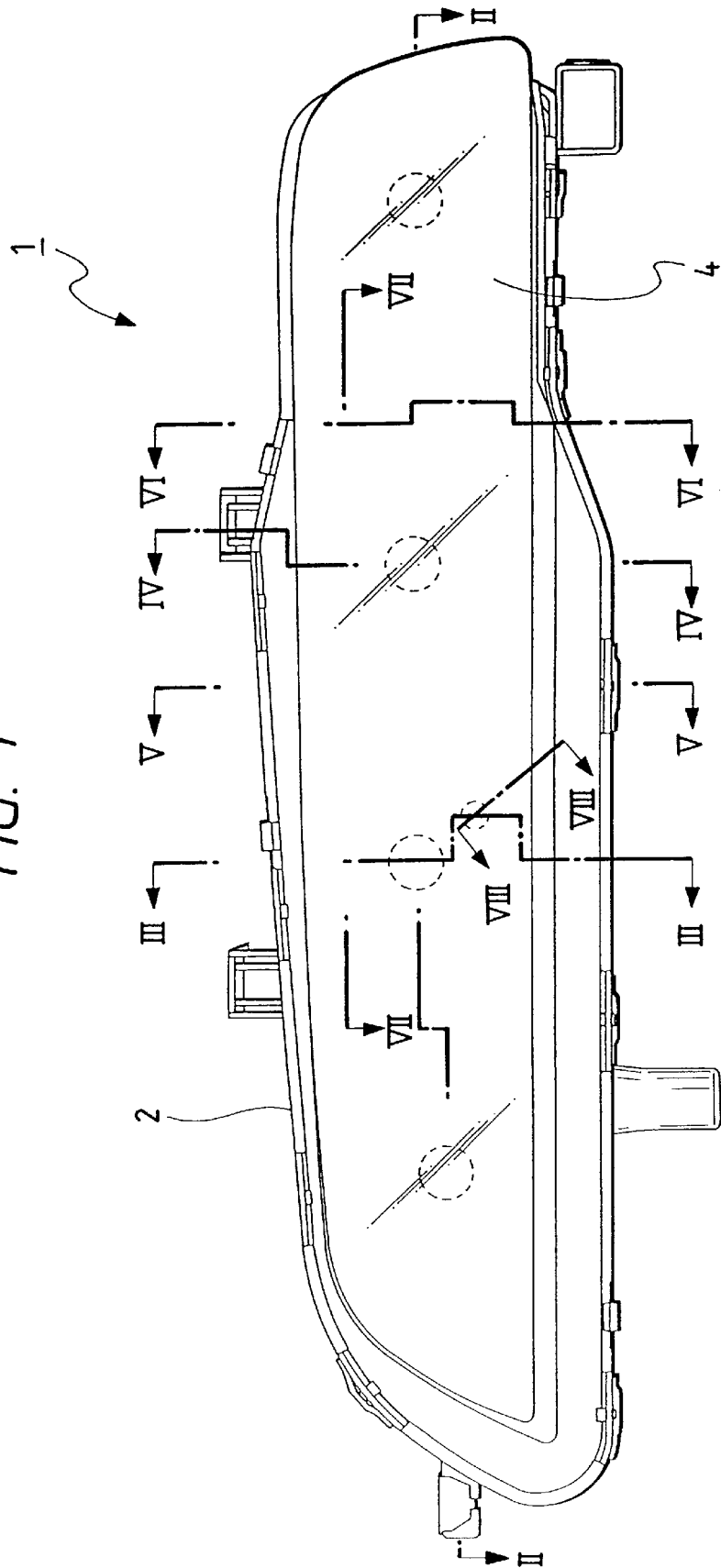
FIG. 1 is a front view of a first embodiment of an automobile headlamp.
Figure 2:
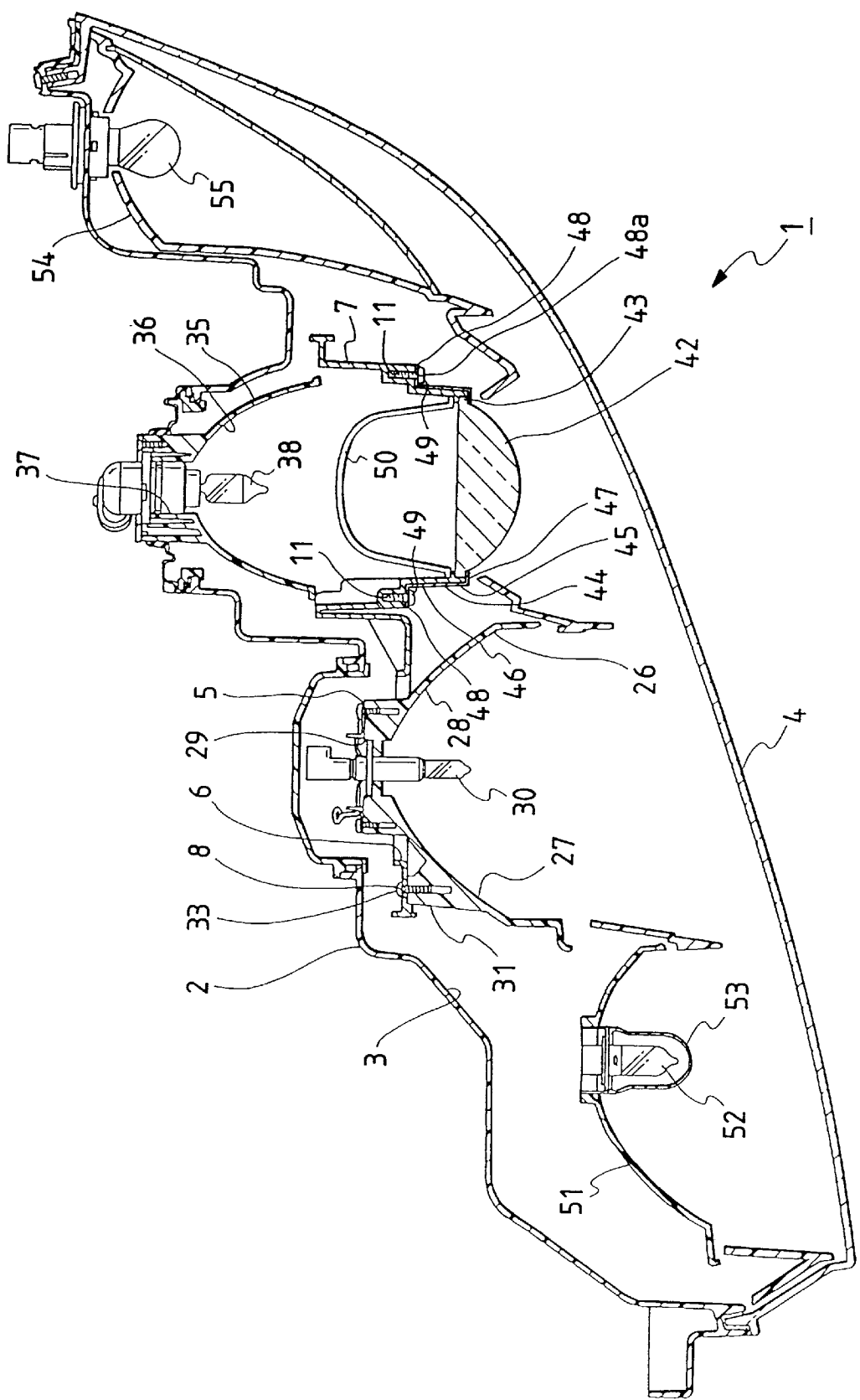
FIG. 2 is a sectional view taken along line II—II in FIG. 1.
Figure 3:
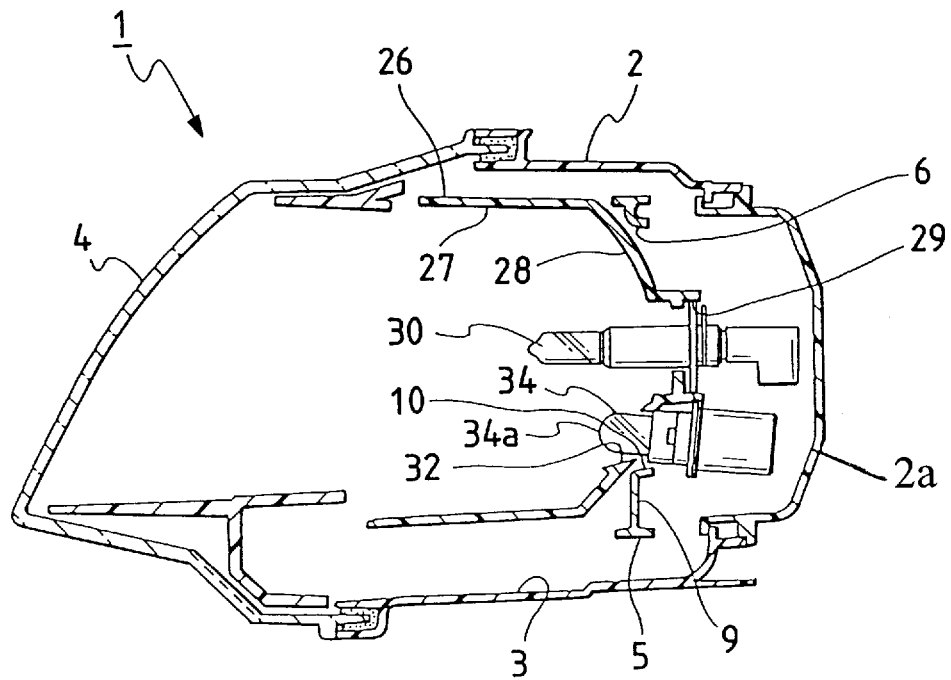
FIG. 3 is a sectional view taken along line III—III in FIG. 1.
Figure 4:
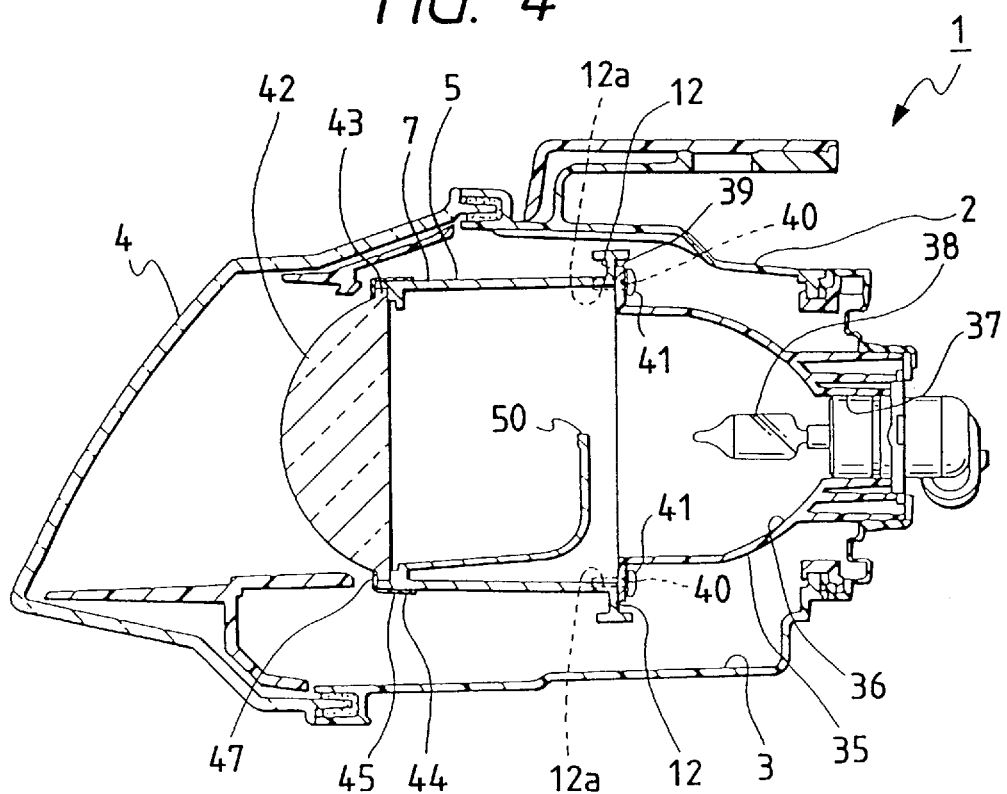
FIG. 4 is a sectional view taken along line IV—IV in FIG. 1.
Figure 5:
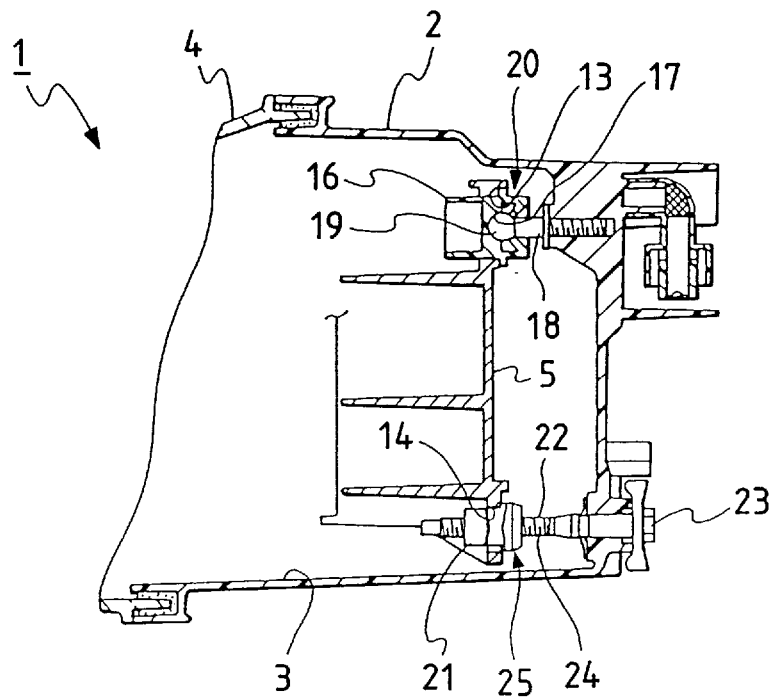
FIG. 5 is a sectional view taken along line V—V in FIG. 1.
Figure 6:
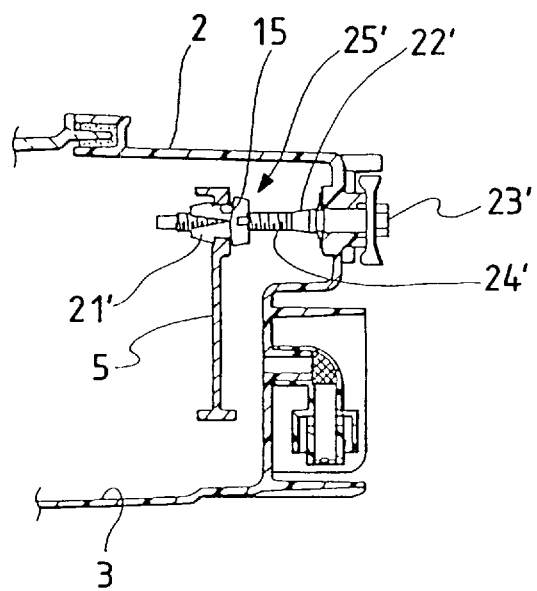
FIG. 6 is a sectional view taken along line VI—VI in FIG. 1.
Figure 7:
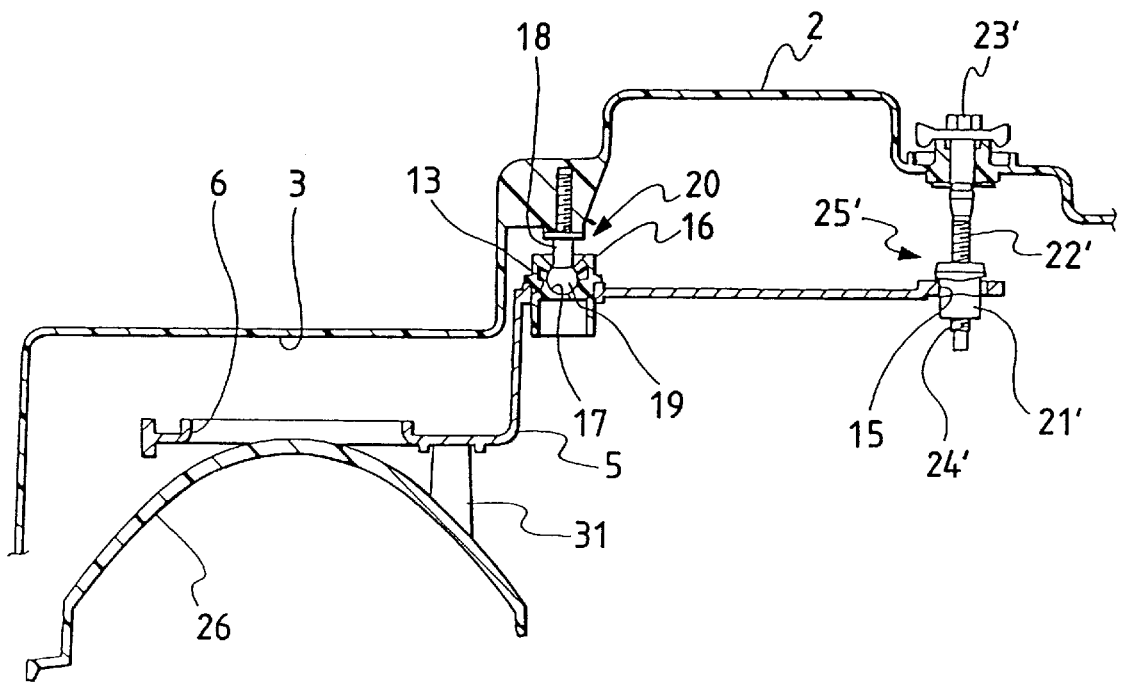
FIG. 7 is a sectional view taken along line VII—VII in FIG. 1.
Figure 8:
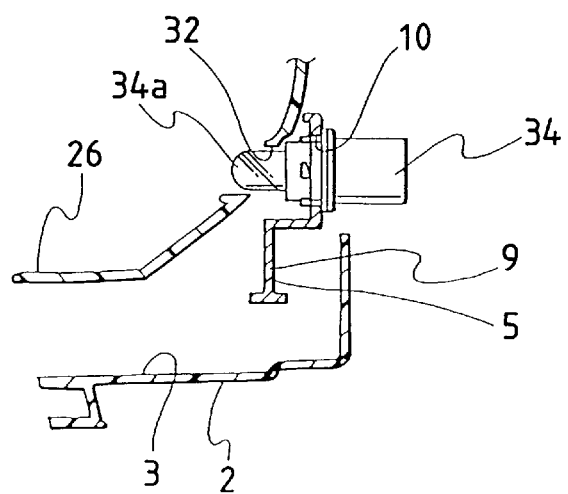
FIG. 8 is a sectional view taken along line VIII—VIII in FIG. 1.
Figure 9:
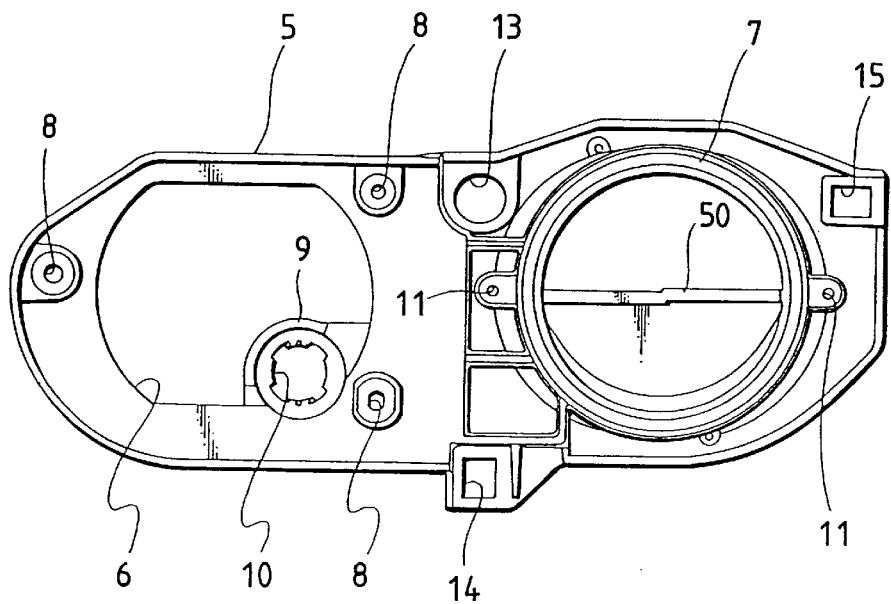
FIG. 9 is a front view of a holder in the automobile headlamp.
Figure 11:
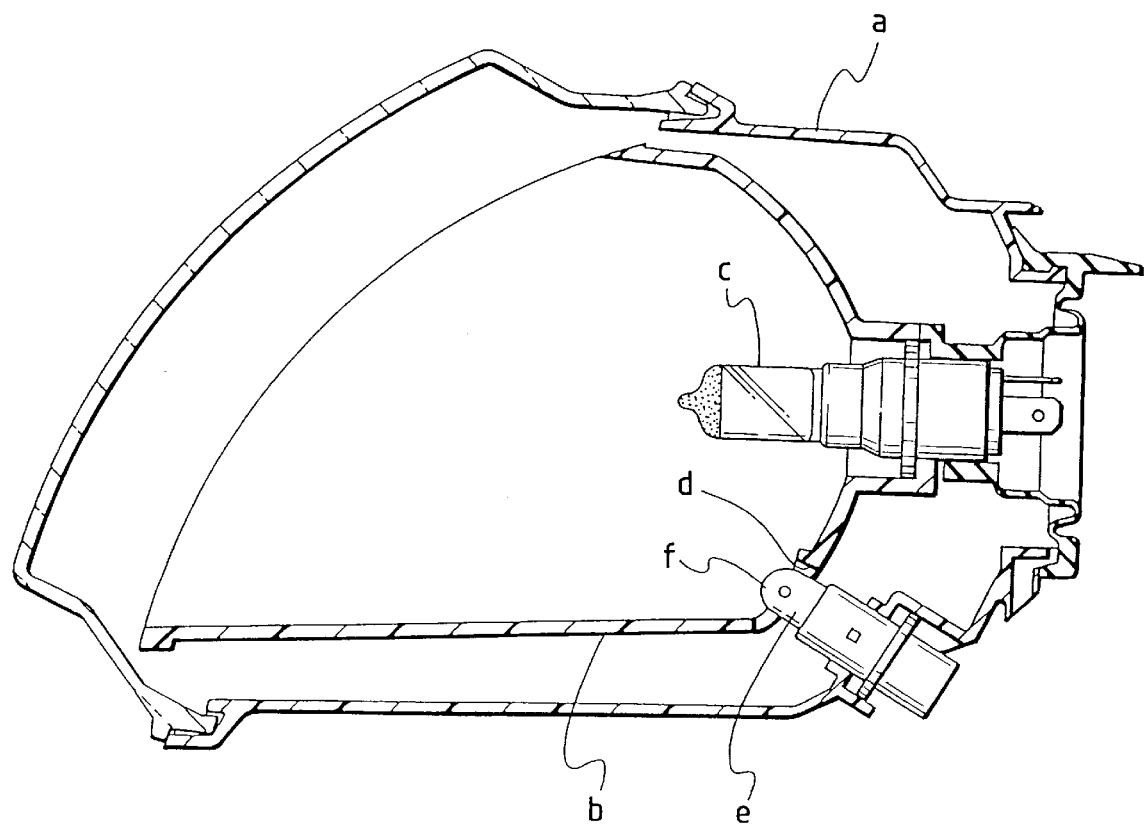
FIG. 11 is a vertical sectional view of a conventional automobile headlamp.

Reference will now be made in detail to the preferred embodiments of the present invention, examples of which are illustrated in the accompanying drawings.

An automobile headlamp, which constitutes a first embodiment of the invention will be described with reference to FIGS. 1 through 9. In those figures, the headlamp is generally indicated at 1.

Reference numeral 2 designates a lamp body which is made of synthetic resin. The lamp body 2 has a recess 3 which is opened forwardly; that is, the lamp body 2 has a front opening, which is covered with a lens 4.

Reference numeral 5 designates a holder of aluminum die-casting. The holder 5 has a relatively large insertion hole 6, and a cylinder 7 beside the insertion hole 6. The cylinder 7 is extended in a front-to-rear direction.

Screw inserting holes 8 are formed around the insertion hole 6. A plate-shaped mounting member 9 protrudes from one corner of the holder 5 which is located below the insertion hole 6. The mounting member 9 has a mounting hole 10.

Threaded holes 11 are formed in the peripheral portions of the cylinder 7, which are confronted with each other. The cylinder 7 has a setting flange 12 at the rear end, and threaded holes 12a are formed in the setting flange 12.

A circular supporting hole 13 is formed in the upper end portion of the holder 5 between the insertion hole 6 and the cylinder 7, and a rectangular supporting hole 14 is provided below the circular supporting hole 13. In addition, the holder 5 has a rectangular supporting hole 15, which is confronted through the cylinder 7 with the circular supporting hole 13.

Reference numeral 16 designates a ball receiving member of synthetic resin. The ball receiving member 16 has a spherical recess 17, which is opened backwardly. The ball receiving member 16 is fitted in the circular supporting hole 13 of the holder 5.

Reference numeral 18 designates a pivot shaft embedded in the inner surface of the lamp body 2. One end portion of the pivot shaft 18 is formed into a ball 19. The ball 19 is rotatably fitted in the spherical recess 17 of the ball receiving member 16, thus providing a swing fulcrum 20.

Reference characters 21 and 21' designate nut members of synthetic resin, which are fitted in the supporting holes 14 and 15, respectively.

Reference characters 22 and 22' designate adjusting shafts which are rotatably supported on the rear wall of the lamp body 2. The adjusting shafts 22 and 22' have heads 23 and 23', respectively, which protrude from the rear wall of the lamp body 2. The adjusting shafts 22 and 22' have threaded portions 24 and 24', which are threadably engaged with the nut members 21 and 21', respectively, thus providing first and second distance adjusting sections 25 and 25'.

As the adjusting shaft 22 of the first distance adjusting section 25 is turned, the threaded portion 24 of the adjusting shaft 22 screws into or out of the nut member 21, so that at the adjusting section 25 the distance between the lamp body 2 and the holder 5 is changed, whereby the holder 5 is tilted (turned) about the line from the swing fulcrum 20 to the second distance adjusting section 25'.

As the adjusting shaft 22' of the second distance adjusting section 25' is turned, the threaded portion 24' of the adjusting shaft 22' screws into or out of the nut member 21', so that at the adjusting section 25' the distance between the lamp body 2 and the holder 5 is changed, whereby the holder 5 is tilted (turned) about the phantom straight line connected between the swing fulcrum 20 and the second distance adjusting section 25'.

Reference numeral 26 denotes a high-beam reflector having a recess 27 which is opened forwardly. A part of the recess 27 is employed as a paraboloid-of-revolution-shaped reflecting surface 28. Reference numeral 29 designates a bulb mounting hole formed in the reflector 26 substantially at the center. A high-beam headlamp bulb 30 is detachably fitted in the bulb mounting hole 29.

Mounting legs 31 extend from the rear surface of the reflector 26. The reflector 26 has a bulb inserting hole 32.

The reflector 26 is mounted on the holder 5 as follows: with the rear end portion of the reflector 26 inserted into the insertion hole 6 of the holder 5, mounting screws 33 are inserted into respective ones of the screw inserting holes 8, and engaged with respective ones of the mounting legs 31, so that the reflector 26 is fixedly mounted on the holder 5.

Reference numeral 34 designates a position lamp bulb. The bulb 34 is detachably fitted in a mounting hole 10, which is formed in the mounting member 9 of the holder 5, in such a manner that its light emitting section 34a extends through the bulb inserting hole 32 of the reflector 26, thus appearing inside the reflector 26.

The portion of the rear wall of the lamp body 2, which is located behind the reflector 26 has a relatively large opening, so that a headlamp bulb 30 and the position lamp bulb 34 are inserted through the opening into the lamp body 2 from behind. The opening is closed with a relatively large cap 2a of synthetic resin which can be detachably engaged with the opening.

Reference numeral 35 designates a low-beam reflector having an ellipsoid-of-revolution-shaped reflecting surface 36. The reflector 35 has a bulb mounting hole 37 at the center, in which a low-beam headlamp bulb 38 is detachably fitted.

The reflector 35 has a mounting flange 39, which extends radially from the edge of its opening. Screw inserting holes 40 are formed in the mounting flange 39.

Mounting screws 41 are inserted into respective ones of the screw inserting holes 40 of the mounting flange 39 from behind, and engage with respective ones of the threaded holes 12a which are formed in the setting flange 12 of the holder 5. Thus, the reflector 35 is mounted in such a manner as to cover the rear end of the cylinder 7 of the holder 5.

Reference numeral 42 denotes a projection lens in the form of a convex lens which has an engaging flange 43 along its periphery. The projection lens 42 is positioned so as to cover the front end of the cylinder 7.

Reference numeral 44 designates a retainer ring which comprises a ring body 45, and legs 46 extended backwardly from the ring body 45. More specifically, a retaining flange 47 extends radially inward from the front edge of the ring body 45, and the rear end portions of the legs 46 are formed into feet 48, which protrude outwardly. The feet 48 have screw inserting holes 48a.

The retainer ring 44 is positioned so that the retaining flange 47 is placed on the front surface of the engaging flange 43 of the projection lens 42, which has been positioned in such a manner as to cover the front end of the cylinder 7 of the holder 5. Under this condition, mounting screws 49 are inserted into respective ones of the screw inserting holes 48a, and engage with respective ones of the threaded holes 11 of the holder 5. Thus, the projection lens 42 has been fixedly mounted on the front end of the cylinder 7 of the holder 5.

Reference numeral 50 designates a light intercepting member, which is integral with the cylinder 7. The light intercepting member 50 blocks part of the light beam which is emitted from the headlamp bulb 38 and reflected from the reflecting surface 36, thus providing a low-beam cutting line.

Reference numeral 51 designates a fog lamp reflector, which is fixedly mounted on the lamp body 2. The reflector 51 has a bulb mounting hole, in which a bulb 52 is detachably fitted. The bulb 52 is covered with a yellow filter cap 53.

Reference numeral 54 denotes a lamp body for a side turn lamp. The lamp body 54 is fixedly provided inside the lamp body 2, and has a bulb 55.

Figure 10:
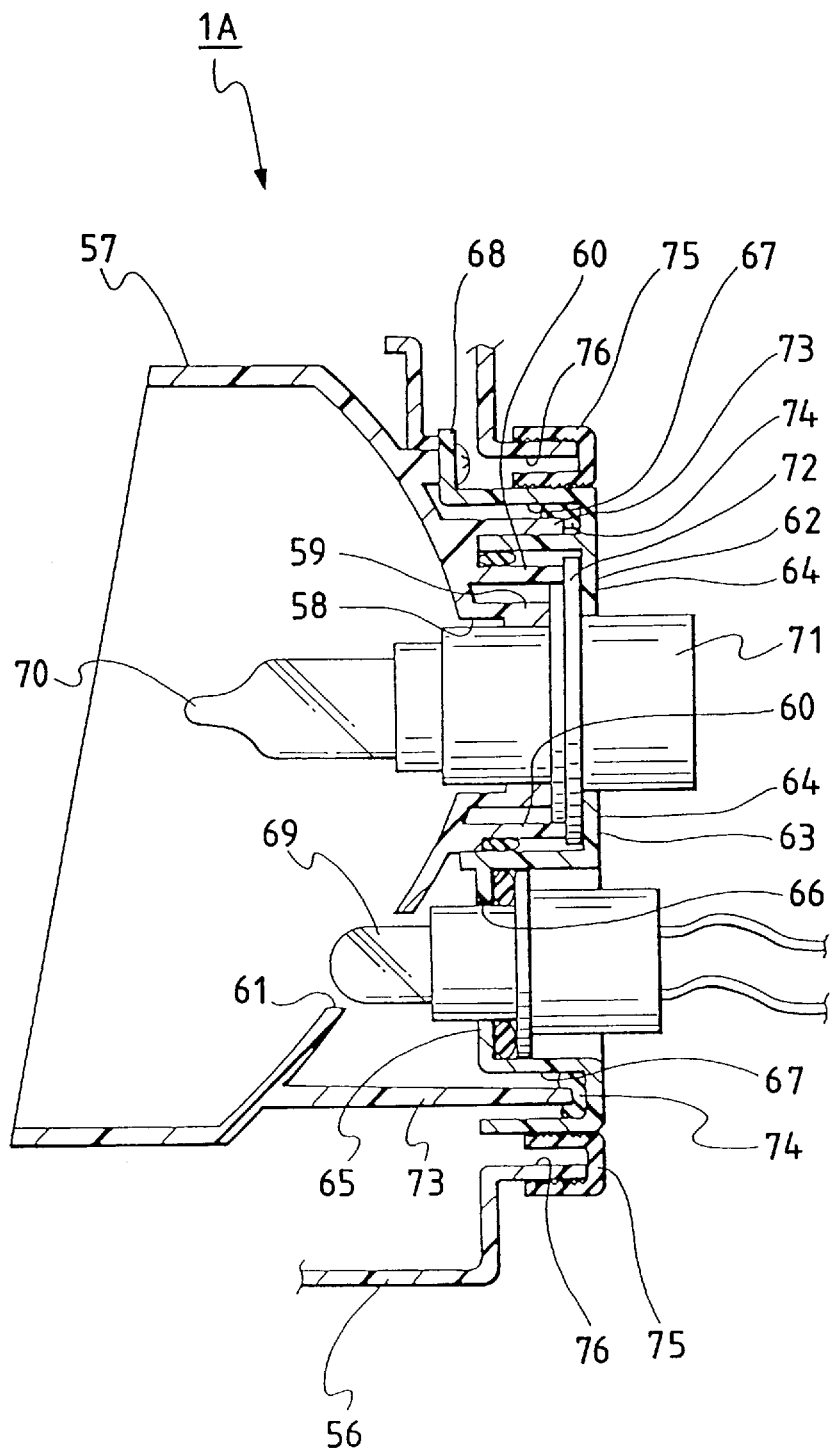
FIG. 10 is a sectional view of a second embodiment of an automobile headlamp of the invention.

FIG. 10 shows another example of the automobile headlamp, which constitutes a second embodiment of the invention. The automobile headlamp 1A comprises a lamp body 56 whose front opening is covered with a lens (not shown).

Reference numeral 57 designates a reflector, which is supported by the lamp body 56 in such a manner that it is tiltable with the aid of one swing fulcrum and two distance adjusting sections.

Reference numeral 58 designates an opening which is formed in the rear portion of the reflector 57. A cylinder 59 extends backwardly from the edge of the opening 58 of the reflector 57. Reference numeral 60 designates a cylindrical wall, which is formed on the rear surface of the reflector 57 in such a manner that it surrounds the cylinder 59 with a small space between them, and its rear end is located slightly behind the rear end of the cylinder 59.

Reference numeral 61 designates a bulb inserting hole, which is formed in the lamp body 56 near the opening 58.

Reference numeral 62 designates a socket fixture having a socket fixture body 63. The inside diameter of the socket fixture body 63 is slightly larger than the outside diameter of the cylindrical wall 60 of the reflector 57. The socket fixture body 63 has a retaining flange 64 at the rear end, which extends radially inward of the socket fixture 62.

Reference numeral 65 designates a supporting piece, which extends from a part of the socket fixture body 63. The supporting piece 65 has a bulb mounting hole 66.

Reference numeral 67 designates an engaging groove, which is formed in the outer peripheral portion of the socket fixture 62 in such a manner that it opens forwardly of the headlamp.

A plurality of mounting pieces 68 (only one mounting piece is shown in FIG. 10) extend radially outward from the outer edge of the wall that defines the engaging groove 67.

Reference numeral 69 designates a position lamp bulb, which is detachably fitted in a bulb mounting hole 66 formed in the supporting piece 65 of the socket fixture 62.

Reference numeral 70 designates a headlamp bulb, which is detachably engaged with a lamp socket 71 having a flange 72.

The lamp socket 71 supporting the headlamp bulb 70 is engaged with the cylinder 59 of the reflector 57. With the flange 72 abutted against the rear end faces of the cylinder 59 and the surrounding wall 60, the rear surface of the flange 72 of the lamp socket 71 is fixedly supported with the retaining flange 64 of the socket fixture 62. Under this condition, the mounting pieces 68 are secured to the rear surface of the reflector 57 with screws.

Thus, the headlamp bulb 70 has been mounted on the reflector 57, while the light emitting section of the position lamp bulb 69 has been inserted into the bulb inserting hole 61, and positioned inside the reflector 57.

In FIG. 10, reference numeral 73 designates a surrounding wall, which is formed outside the surrounding wall 60. The rear end portion of the surrounding wall 73 is engaged through a packing 74 with an engaging groove 67 of the socket fixture 62. The packing 74 is interposed between the surrounding wall 60 of the reflector 57 and the socket fixture 62.

Reference numeral 75 designates a water-proof cover of rubber, which is interposed between an opening 76 formed in the lamp body 56 and the socket fixture 62.

As was described above, the automobile headlamp of the invention has a headlamp bulb and a position lamp bulb. The reflector, on which the headlamp bulb is mounted, is supported on the lamp body in such a manner that the reflector is tiltable, and has the bulb inserting hole; and the position lamp bulb, which is tiltable together with the reflector, is inserted through the inserting hole into the reflector and positioned inside the latter.

That is, with the automobile headlamp of the invention, the position lamp bulb is tiltable together with the reflector lamp. Hence, the bulb inserting hole for the position lamp bulb may be reduced in diameter to the extent that it is just large enough for insertion of the position lamp bulb. Accordingly, the resultant bulb inserting hole is not noticeable even when viewed through the front lens. This feature improves the external appearance of the headlamp. In addition, the reduction in diameter of the bulb inserting hole contributes to the increase in effective reflection surface of the reflector.

It will be apparent to those skilled in the art that various modifications and variations can be made in the automobile headlamp of the present invention without departing from the spirit or scope of the invention. Thus, it is intended that the present invention cover the modifications and variations of this invention provided they come within the scope of the appended claims and their equivalents.

What is claimed is:

1. An automobile headlamp comprising:
   a headlamp bulb;
   a position lamp bulb;
   a lamp body;
   a high-beam reflector supported on the lamp body so as to be tiltable, the high-beam reflector having an inserting hole;
   a low-beam headlamp bulb and a low-beam reflector supported on the lamp body; and
   at least one shaft connected to the lamp body and the high-beam reflector, wherein the shaft is adjusted to tilt the high-beam reflector,
   wherein the headlamp bulb is mounted on the high-beam reflector, and wherein the position lamp bulb is tiltable together with the high-beam reflector and is inserted through the inserting hole so as to be positioned inside the high-beam reflector.

2. The automobile headlamp as claimed in claim 1, wherein the position lamp bulb is positioned in the inserting hole so as to maximize reflectivity and to minimize shadow.

3. The automobile headlamp as claimed in claim 1, wherein a diameter of the inserting hole is substantially the same as a diameter of the position lamp bulb.

4. The automobile headlamp as claimed in claim 1, further comprising:

a light intercepting member supported on the lamp body.

5. An automobile headlamp comprising:

a headlamp bulb;

a position lamp bulb;

a lamp body; and a reflector tiltably supported on the lamp body and having an inserting hole, wherein the headlamp bulb is mounted on the reflector, and the position lamp bulb is inserted through the inserting hole to be positioned inside the reflector and tiltable together with the reflector, and wherein the headlamp bulb is a traveling headlamp bulb and the reflector is a traveling high-beam reflector, and wherein the automobile headlamp further comprises a low-beam headlamp bulb and a low-beam reflector supported on the lamp body.

6. The automobile headlamp as claimed in claim 5, further comprising:

a holder tiltably supported by the lamp body, wherein the reflector is supported on the holder and wherein the holder is supported by the lamp body by a swing fulcrum.

7. The automobile headlamp as claimed in claim 6, wherein the swing fulcrum comprises:

a pivot shaft embedded in an inner surface of the lamp body, one portion of the pivot shaft being received by a receiving member; and wherein the holder has a supporting hole for supporting the receiving member.

8. The automobile headlamp as claimed in claim 6, wherein the swing fulcrum comprises:

a ball receiving member having a spherical recess;

a pivot shaft embedded in an inner surface of the lamp body, one portion of the pivot shaft being formed into a ball, the ball of the pivot shaft being rotatably fitted in the spherical recess of the ball receiving member; and wherein the holder has a supporting hole for supporting the ball receiving member.

9. The automobile headlamp as claimed in claim 5, further comprising a first adjusting shaft for adjusting a distance between the lamp body and the holder.

10. The automobile headlamp as claimed in claim 9, further comprising a second adjusting shaft supported on the lamp body for further adjusting a distance between the lamp body and the holder.

11. An automobile headlamp comprising:

a headlamp bulb;

a position lamp bulb;

a lamp body;

a holder tiltably supported by the lamp body; and a reflector supported on the holder and tiltable with the holder, the reflector having an inserting hole, wherein the headlamp bulb is mounted on the reflector, and wherein the position lamp bulb is tiltable together with the reflector and is inserted through the inserting hole so as to be positioned inside the reflector and wherein the position lamp bulb is supported by the holder.

12. The automobile headlamp as claimed in claim 11, wherein the holder is supported by the lamp body by a swing fulcrum.

13. The automobile headlamp as claimed in claim 12, wherein the swing fulcrum comprises:

a pivot shaft embedded in an inner surface of the lamp body, one portion of the pivot shaft being received by a receiving member; and wherein the holder has a supporting hole for supporting the receiving member.

14. The automobile headlamp as claimed in claim 12, wherein the swing fulcrum comprises:

a ball receiving member having a spherical recess;

a pivot shaft embedded in an inner surface of the lamp body, one portion of the pivot shaft being formed into a ball, the ball of the pivot shaft being rotatably fitted in the spherical recess of the ball receiving member; and wherein the holder has a supporting hole for supporting the ball receiving member.

15. The automobile headlamp as claimed in claim 11, further comprising a first adjusting shaft for adjusting a distance between the lamp body and the holder.

16. The automobile headlamp as claimed in claim 15, further comprising a second adjusting shaft supported on the lamp body for further adjusting a distance between the lamp body and the holder.

17. The automobile headlamp as claimed in claim 11, wherein a diameter of the inserting hole is substantially the same as a diameter of the position lamp bulb.

18. The automobile headlamp as claimed in claim 11, wherein the headlamp bulb is a traveling headlamp bulb and the reflector is a traveling high-beam reflector, and wherein the automobile headlamp includes a low-beam headlamp bulb and a low-beam reflector supported on the lamp body.

19. An automobile headlamp comprising:

a headlamp bulb;

a position lamp bulb;

a lamp body;

a high-beam reflector supported on the lamp body so as to be tiltable, the high-beam reflector having an inserting hole;

a fog lamp bulb and a fog lamp reflector supported on the lamp body; and at least one shaft connected to the lamp body and the high-beam reflector, wherein the shaft is adjusted to tilt the high-beam reflector, wherein the headlamp bulb is mounted on the high-beam reflector, and wherein the position lamp bulb is tiltable together with the high-beam reflector and is inserted through the inserting hole so as to be positioned inside the high-beam reflector.

20. The automobile headlamp as claimed in claim 19, further comprising:

a light intercepting member supported on the lamp body.

* * * * *